(12) United States Patent
Yoo et al.

(10) Patent No.: US 11,735,803 B2
(45) Date of Patent: Aug. 22, 2023

(54) ANTENNA APPARATUS

(71) Applicant: KMW INC., Hwaseong-si (KR)

(72) Inventors: Chang Woo Yoo, Hwaseong-si (KR); Min Sik Park, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 340 days.

(21) Appl. No.: 17/241,100

(22) Filed: Apr. 27, 2021

(65) Prior Publication Data

US 2021/0249752 A1   Aug. 12, 2021

Related U.S. Application Data

(63) Continuation of application No. PCT/KR2019/014244, filed on Oct. 28, 2019.

(30) Foreign Application Priority Data

Oct. 30, 2018 (KR) .......................... 10-2018-0131191
Oct. 28, 2019 (KR) .......................... 10-2019-0134435

(51) Int. Cl.
*H01Q 1/02* (2006.01)
*H04B 1/00* (2006.01)
(Continued)

(52) U.S. Cl.
CPC .............. *H01Q 1/02* (2013.01); *H04B 1/0078* (2013.01); *H04B 1/036* (2013.01); *H04B 1/04* (2013.01); *H04B 2001/0408* (2013.01)

(58) Field of Classification Search
CPC .............. H01Q 1/02; H01Q 1/246; H01Q 1/22
See application file for complete search history.

(56) References Cited

U.S. PATENT DOCUMENTS 10,283,849 B2 *   5/2019   Hirata ....................... H04B 1/38
11,081,777 B2 *   8/2021   Kim ........................ H01Q 1/42
(Continued)

FOREIGN PATENT DOCUMENTS

CN   207319430 U   5/2018
JP   2011-155049 A   8/2011
(Continued)

OTHER PUBLICATIONS

International Search Report for PCT/KR2019/014244, dated Feb. 5, 2020 and its English translation.
Non-final office action dated May 10, 2022 from the Japanese Office Action for Japanese Application No. 2021-548489.

*Primary Examiner* — Awat M Salih
(74) *Attorney, Agent, or Firm* — Insight Law Group, PLLC; Seung Lee

(57) ABSTRACT

The present invention relates to an antenna apparatus, which specifically comprises: a filter unit which is disposed to form at least one layer; an electric appliance unit which is coupled and is spaced apart from the filter unit to form a layer different from that of the filter unit, and includes various electric devices installed therein; a filter unit heat dissipation module which is coupled to the opposite surface of a surface of the filter unit, the surface being coupled to the electric appliance unit, and thus radiates heat generated from the filter unit to the outside; and an electric appliance unit heat dissipation module including a first electric appliance unit heat dissipation module and a second electric appliance unit heat dissipation module, wherein: the first electric appliance unit heat dissipation module is coupled to the opposite surface of a surface of the electric appliance unit, the surface being coupled to the filter unit, and thus radiates, to the outside, heat generated from first heating elements intensively disposed at one side of the filter unit; and the second electric appliance unit heat dissipation module is provided in (Continued)

parallel to the first electric appliance unit heat dissipation module and radiates, to the outside, heat generated from second heating elements intensively disposed at the other side of the filter unit. Accordingly, the present invention provides advantages of improving assembling performance and maximizing heat dissipation performance.

12 Claims, 16 Drawing Sheets

(51) Int. Cl.
  *H04B 1/036* (2006.01)
  *H04B 1/04* (2006.01)

(56) References Cited

U.S. PATENT DOCUMENTS

| | | | |
|---|---|---|---|
| 2016/0119796 A1 | 4/2016 | Ho et al. | |
| 2023/0082434 A1* | 3/2023 | Yoon | H05K 1/0207 |

FOREIGN PATENT DOCUMENTS

| | | | |
|---|---|---|---|
| JP | 2016-506614 A | 3/2016 |
| JP | 2017-046121 A | 3/2017 |
| KR | 10-2016-0121491 A | 10/2016 |
| KR | 10-1879404 B1 | 7/2018 |
| WO | 2018-182379 A1 | 10/2018 |
| WO | 2018-194425 A1 | 10/2018 |

* cited by examiner

ANTENNA APPARATUS

TECHNICAL FIELD

The present disclosure relates to an antenna apparatus, and more particularly, to an antenna apparatus for wireless communication.

BACKGROUND ART

Wireless communication technology such as Multiple-input multiple-output (MIMO) is a technology that dramatically increases data transmission capacity by means of multiple antennas and that employs a spatial multiplexing scheme in which transmitters transmit different types of data through individual transmit antennas and receivers separate the transmitted data through appropriate signal processing.

Accordingly, as the number of transmit/receive antennas is increased simultaneously, it is possible to transmit more data through an increase in channel capacity. For example, if 10 antennas are used, a channel capacity of approximately 10 times is achieved in the same frequency band, compared to a current single antenna system.

A 4G LTE-advanced network uses up to 8 antennas, and products equipped with 64 or 128 antennas are currently being developed for a pre-5G network. A 5G network expects to use base station equipment with a much larger number of antennas, which is called Massive MIMO. Although cell operation is currently implemented in a 2-dimensional manner, 3D-beamforming becomes possible by introduction of Massive MIMO, which is also called full dimension MIMO FD-MIMO.

In the Massive MIMO, as the number of antennas increases, the number of transmitters and filters increases as well. Nevertheless, due to the lease cost and space constraints of the installation site, the Massive MIMO that makes it possible for RF components (antennas, filters, power amplifiers, transceivers, etc.) to be small, light, and inexpensive requires high power for coverage expansion. Such high power causes significant power consumption and heating value acting as negative factors in reducing the weight and size of components.

In particular, when a MIMO antenna in which modules implemented with RF elements and digital elements are combined in a stacked structure is installed in a confined space, it is necessary to design a plurality of layers constituting the MIMO antenna to be compact and miniaturized in order to maximize ease of installation or space utilization. In this case, there is a need for a new design for heat dissipation structure for heat generated by communication components mounted on the layers.

DISCLOSURE

Technical Problem

An object of the present disclosure is to provide an antenna apparatus with improved heat dissipation performance.

Another object of the present disclosure is to provide an antenna apparatus having a simpler arrangement structure while matching and arranging independent heat dissipation parts corresponding to a group of heating elements with the same specification and dimension.

A further object of the present disclosure is to provide an antenna apparatus including a power connector (first interface block connector) and an RF connector (second interface block connector) excellent in compatibility and applicability.

The present disclosure is not limited to the above-mentioned objects, and other objects of the present disclosure can be clearly understood by those skilled in the art to which the present disclosure pertains from the following description.

Technical Solution

According to an aspect of an exemplary embodiment, there is provided an antenna apparatus that includes a filter unit disposed to form at least one layer, an electronics unit spaced apart from the filter unit to form a layer different from that of the filter unit, and equipped therein with various electrical/electronic devices, a filter unit heat dissipation module coupled to a surface opposite to the surface of the filter unit to which the electronics unit is coupled, to radiate heat generated by the filter unit to the outside, and an electronics unit heat dissipation module including a first electric unit heat dissipation module coupled to a surface opposite to the surface of the electronics unit to which the filter unit is coupled, to radiate heat, generated by first heating elements intensively arranged on one side of the filter unit, to the outside, and a second electronics unit heat dissipation module provided in parallel with the first electronics unit heat dissipation module to radiate heat, generated by second heating elements intensively arranged on the other side of the filter unit, to the outside.

The filter unit and the electronics unit may be spaced apart at a predetermined distance from each other by a plurality of air supporters each having one end coupled to the filter unit and the other end coupled to the electronics unit.

The filter unit may include a filter unit body having a predetermined installation space defined on one side thereof, a power amplifier (PA) printed circuit board (PCB) disposed in the installation space of the filter unit body, and having a plurality of main transistors (TRs) for power amplification mounted on one surface thereof, and a filter PCB spaced apart at a predetermined distance from the PA PCB, and having a plurality of low pass filters (LPFs) arranged on one surface thereof. The filter unit may form two layers through the PA PCB and the filter PCB.

The filter unit heat dissipation module may be coupled to the outside of the filter unit body in order to radiate heat, generated by the main TRs for power amplification, via heat transfer paths through the filter unit body.

The filter unit heat dissipation module may include a heat collection plate adhered to a heating surface of each of the main TRs for power amplification to collect heat, a first radiating fin part disposed to be in contact with an outer surface of the heat collection plate and having a plurality of radiating fins formed thereon, a second radiating fin part spaced horizontally outward from the first radiating fin part and having a plurality of radiating fins formed thereon to radiate heat, transferred from the first radiating fin part, at a long distance, a heat transfer medium block configured to transfer heat from the heat collection plate to the first radiating fin part, and a plurality of heat pipes, each having one end inserted between the first radiating fin part and the heat transfer medium block and the other end connected to the second radiating fin part, so as to transfer heat from the heat transfer medium block to the second radiating fin part.

The heat collection plate and the heat transfer medium block may be made of copper.

The electronics unit may include an electronics unit body having at least two partitioned installation spaces while being open toward the filter unit, the electronics unit body having a plurality of radiating fins integrally formed on a surface (hereinafter, referred to as an "outer surface") opposite to its surface to which the filter unit is adjacent, which is a portion corresponding to one of the at least two partitioned installation spaces (hereinafter, one space is referred to as a "first installation space", and the other is referred to as a "second installation space"), a first electronics PCB installed in the first installation space of the electronics unit body, a plurality of field programmable gate arrays (FPGAs) being mounted on one surface of the first electronics PCB facing the outer surface, and a second electronics PCB installed in the second installation space of the electronics unit body, a plurality of power supply unit (PSU) DC power modules being mounted on one surface of the second electronics PCB facing the outer surface. The first and second electronics PCBs may be partitioned by the first and second installation spaces at the same height to form one layer.

The electronics unit heat dissipation module may include a first electronics-side heat dissipation section disposed to be in thermal contact with the FPGAs through a plurality of heat transfer holes formed in the electronics unit body, and located further outward than the radiating fins formed on the electronics unit body, and a second electronics-side heat dissipation section coupled to the outer surface of the electronics unit body to close an opening formed in the electronics unit body, and provided to be in contact with the PSU DC power modules on the first electronics PCB.

The first electronics-side heat dissipation section may include a heat collection plate adhered to a heating surface of each of the FPGAs to collect heat, a first radiating fin part disposed to be in contact with an outer surface of the heat collection plate and having a plurality of radiating fins formed thereon, a second radiating fin part spaced horizontally outward from the first radiating fin part and having a plurality of radiating fins formed thereon to radiate heat, transferred from the first radiating fin part, at a long distance, a heat transfer medium block configured to transfer heat from the heat collection plate to the first radiating fin part, and a plurality of heat pipes, each having one end inserted between the first radiating fin part and the heat transfer medium block and the other end connected to the second radiating fin part, so as to transfer heat from the heat transfer medium block to the second radiating fin part.

The heat collection plate and the heat transfer medium block may be made of copper.

The second electronics-side heat dissipation section may have a plurality of radiating fins, which are integrally formed thereon and have the same height as the radiating fins formed on the outer surface of the electronics unit body.

The filter unit may have at least one filter-side power connection terminal and at least one filter-side signal connection terminal, and the electronics unit may have at least one electronics-side power connection terminal and at least one electronics-side signal connection terminal. The antenna apparatus may further include a first interface block connector coupled to, and configured to form a thick portion at, one side thereof to interconnect the at least one filter-side power connection terminal and the at least one electronics-side power connection terminal, and a second interface block connector coupled to, and configured to form a thick portion at, the other side thereof to interconnect the at least one filter-side signal connection terminal and the at least one electronics-side signal connection terminal.

Advantageous Effects

An antenna apparatus according to exemplary embodiments of present disclosure can achieve various effects as follows.

First, the present disclosure has an effect of improving heat dissipation performance.

Second, the present disclosure can implement a very effective heat dissipation design as well as improving assembly properties through a simpler arrangement structure while matching and arranging independent heat dissipation parts corresponding to a group of heating elements with the same specification and dimension.

Third, the present disclosure can improve compatibility and applicability.

LIST OF REFERENCE NUMERALS

Figure 1:
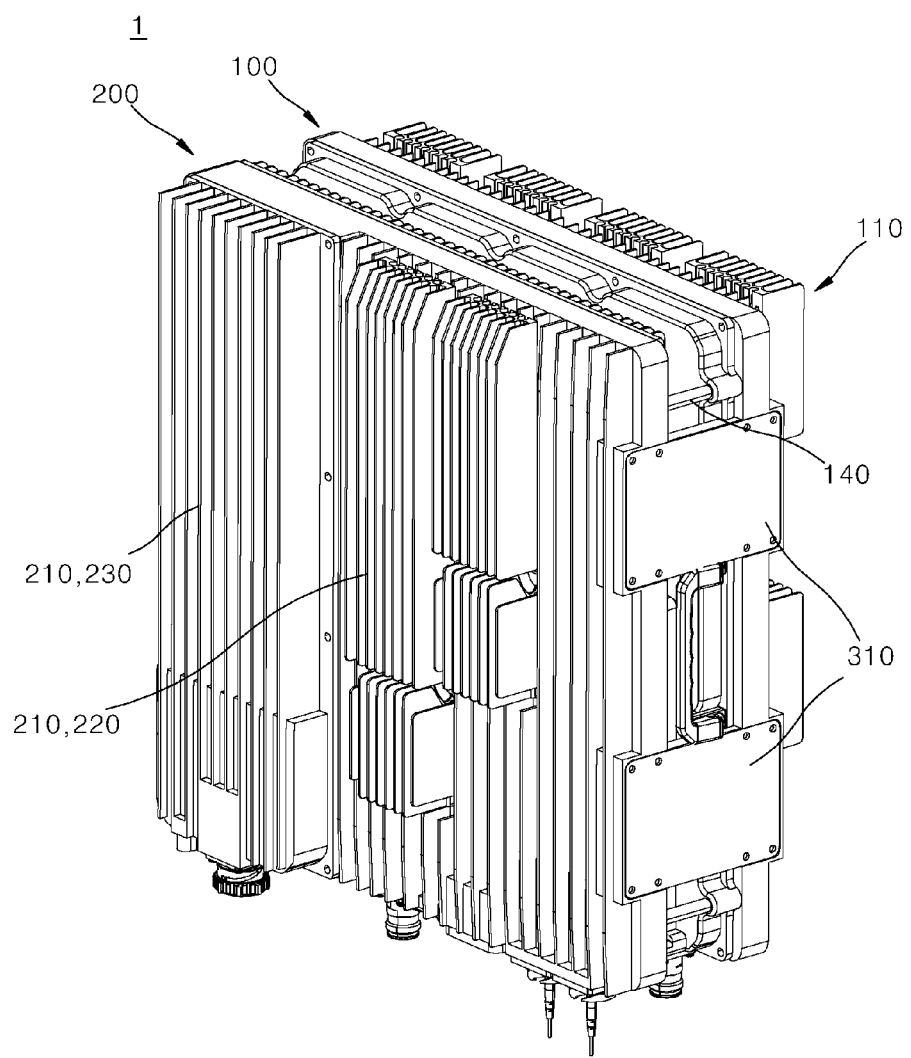
FIG. 1 is a perspective view illustrating an antenna apparatus according to an embodiment of the present disclosure.

1: antenna apparatus 100: filter unit
100*a*: filter unit body 107*a*: filter printed circuit board (PCB)
102: enclosure 103: enclosure cover
104: RET port 110: filter unit heat dissipation module
111: heat collection plate 112: heat transfer medium block
113: first radiating fin part 114: heat pipe
115: second radiating fin part 200: electronics unit
200*a*: electronics unit body 210: electronics unit heat dissipation module
220: first electronics-side heat dissipation section 230: second electronics-side heat dissipation section
310: first interface block connector
320: second interface block connector
400: air supporter

BEST MODE

Hereinafter, an antenna apparatus according to exemplary embodiments of the present disclosure will be described in detail with reference to the accompanying drawings. It should be noted that reference numerals are added to the components of the accompanying drawings to facilitate understanding of the embodiments described below and the same reference numbers will be used throughout the drawings to refer to the same or like parts wherever possible. In certain embodiments, detailed descriptions of constructions or functions well known in the art may be omitted to avoid obscuring appreciation of the disclosure by a person of ordinary skill in the art.

The terms such as "first", "second", "A", "B", "(a)", and "(b)" may be used herein to describe components in the embodiments of the present disclosure. These terms are not used to define an essence, order or sequence of a corresponding component but used merely to distinguish the corresponding component from other component(s). Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
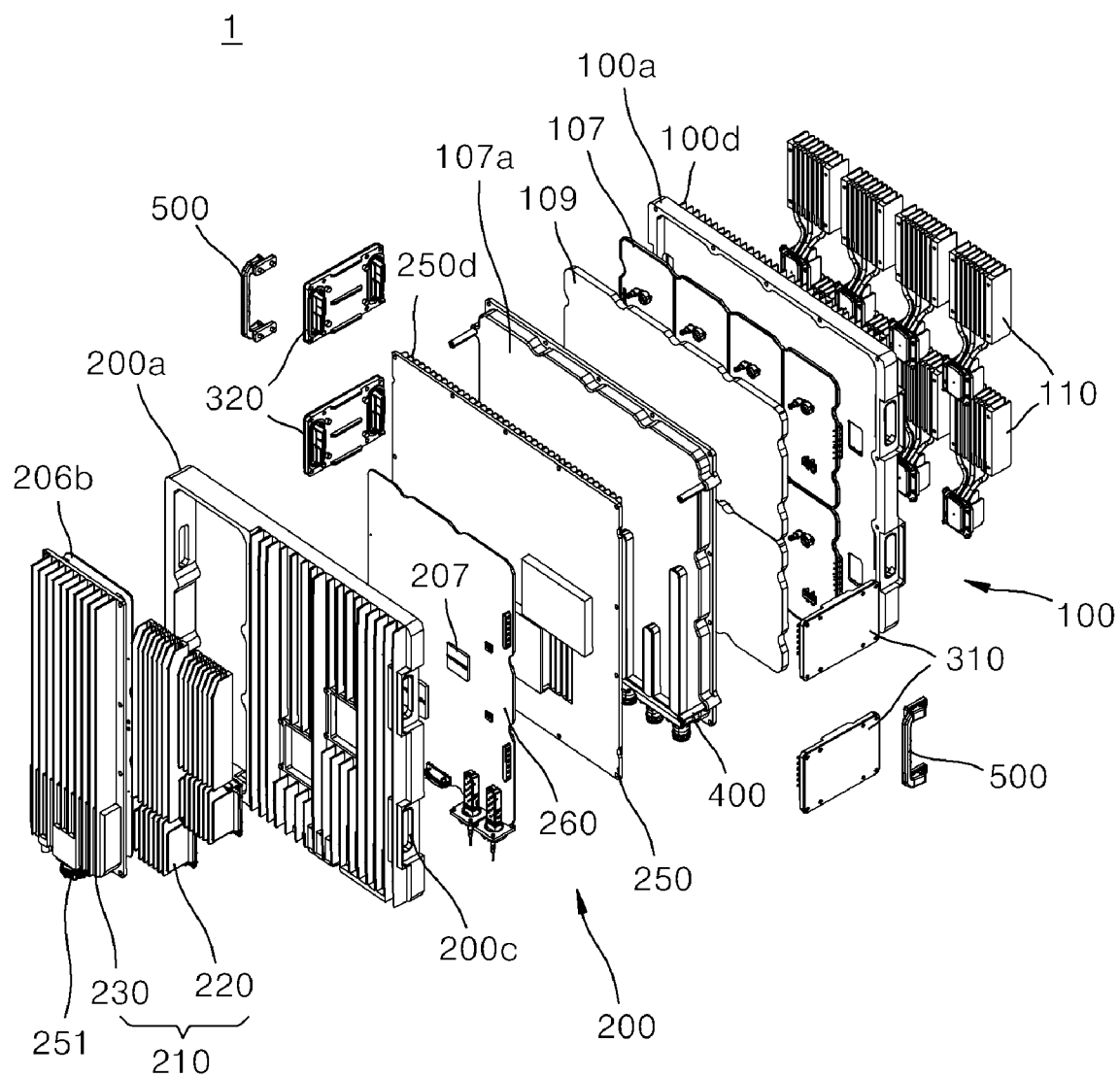
FIG. 2 is an exploded perspective view of FIG. 1.

FIG. 1 is a perspective view illustrating an antenna apparatus according to an embodiment of the present disclosure. FIG. 2 is an exploded perspective view of FIG. 1.

As illustrated in FIGS. 1 and 2, the antenna apparatus, which is designated by reference numeral 1, according to the embodiment of the present disclosure includes a filter unit 100 equipped therein with an antenna assembly or filters, and an electronics unit 200 equipped therein with various electrical/electronic devices.

Although not illustrated in the drawing, the filter unit 100 is a unit to which an antenna assembly composed of RF elements and digital elements and low pass filters (LPFs) 105 are mounted or bonded. The RF elements, the digital elements, and the LPFs 105 may be separately installed on a filter printed circuit board (PCB) 107a or a power amplifier (PA) PCB 107b in which an RF feeding network is implemented.

Figure 3A:
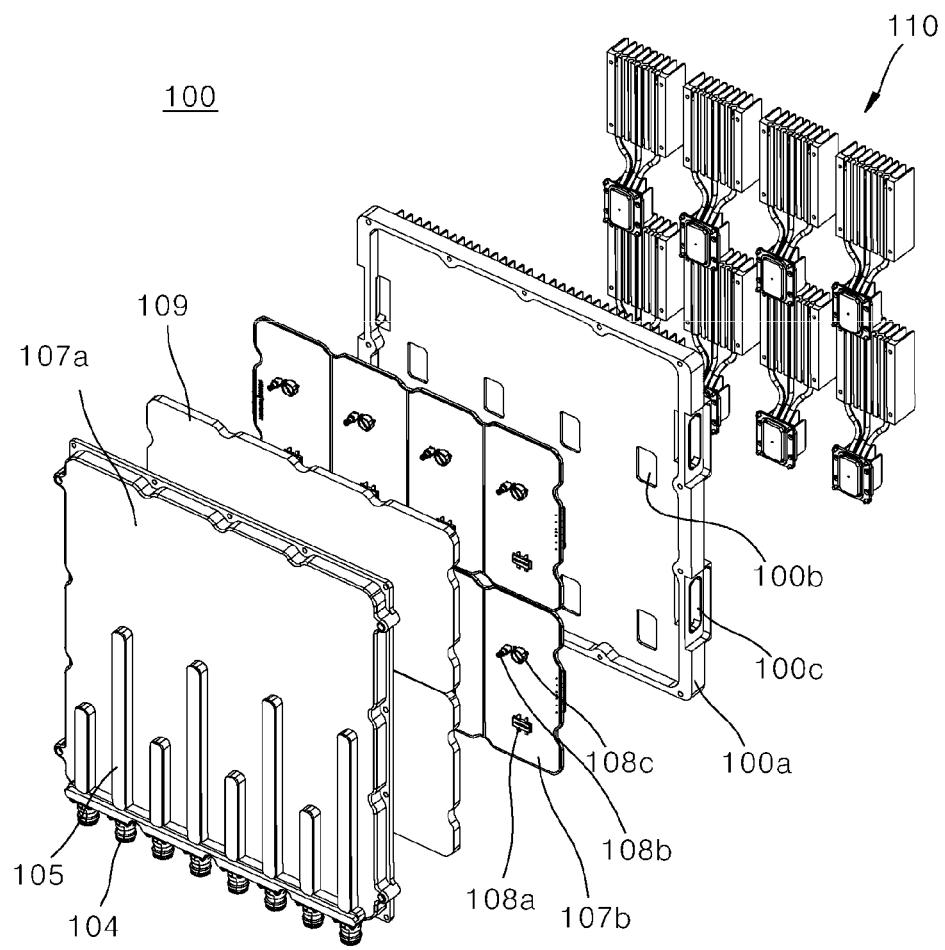
FIGS. 3A and 3B are exploded perspective views illustrating a filter unit in the configuration of FIG. 1.
Figure 3B:
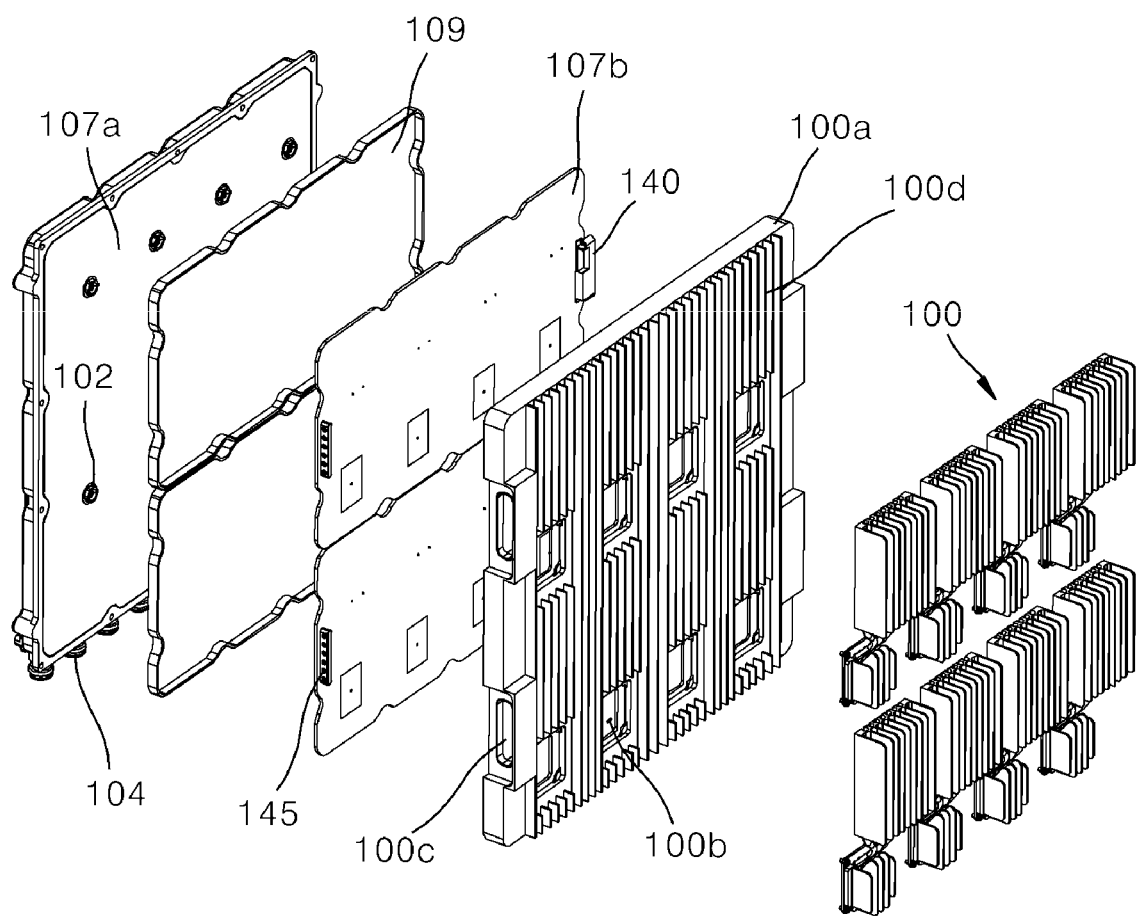
Figure 4:
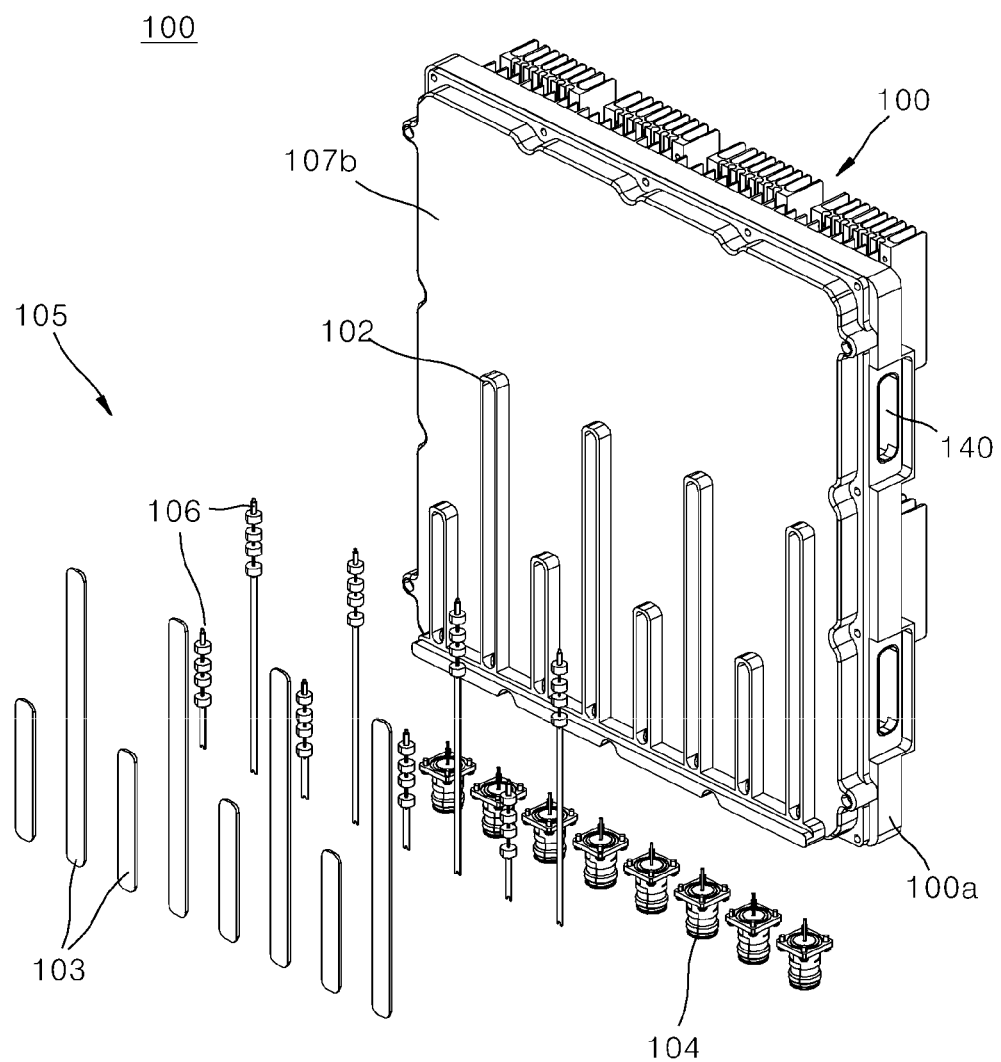
FIG. 4 is an exploded perspective view illustrating low pass filters (LPFs) installed on a filter printed circuit board (PCB) of the filter unit of FIGS. 3A and 3B.
Figure 5A:
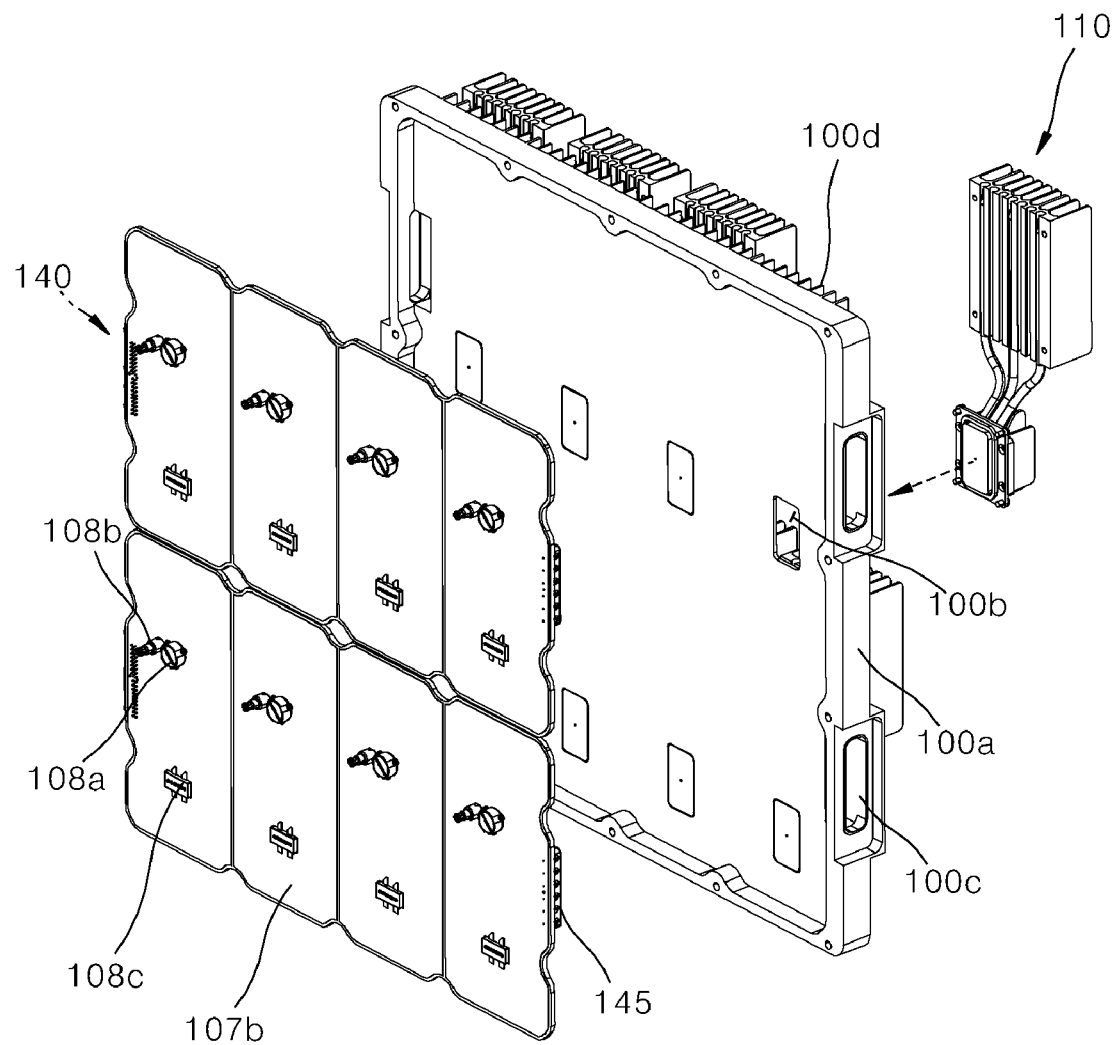
FIGS. 5A and 5B are exploded perspective views illustrating a power amplifier (PA) PCB of the filter unit of FIGS. 3A and 3B.
Figure 5B:
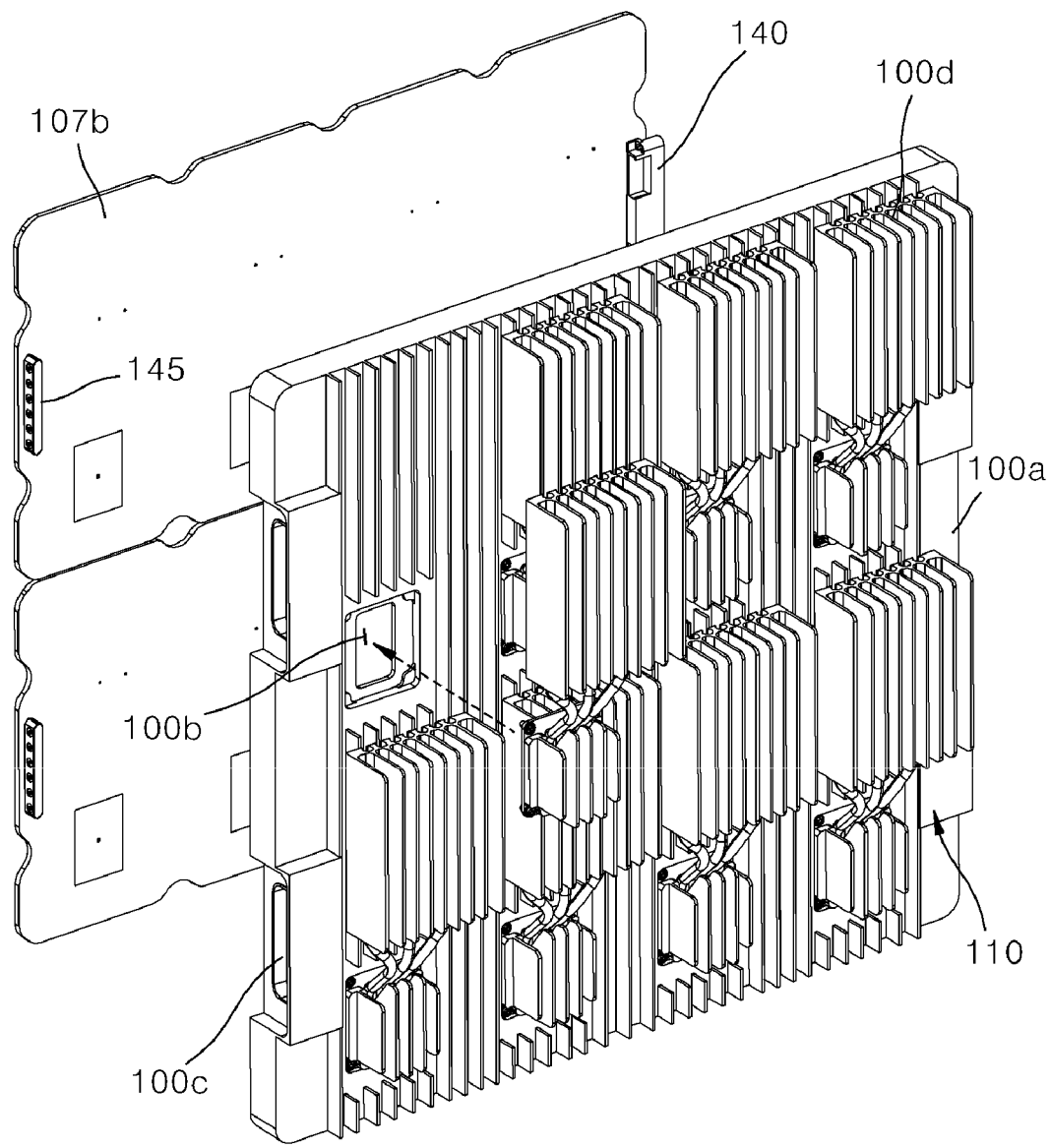
Figure 6:
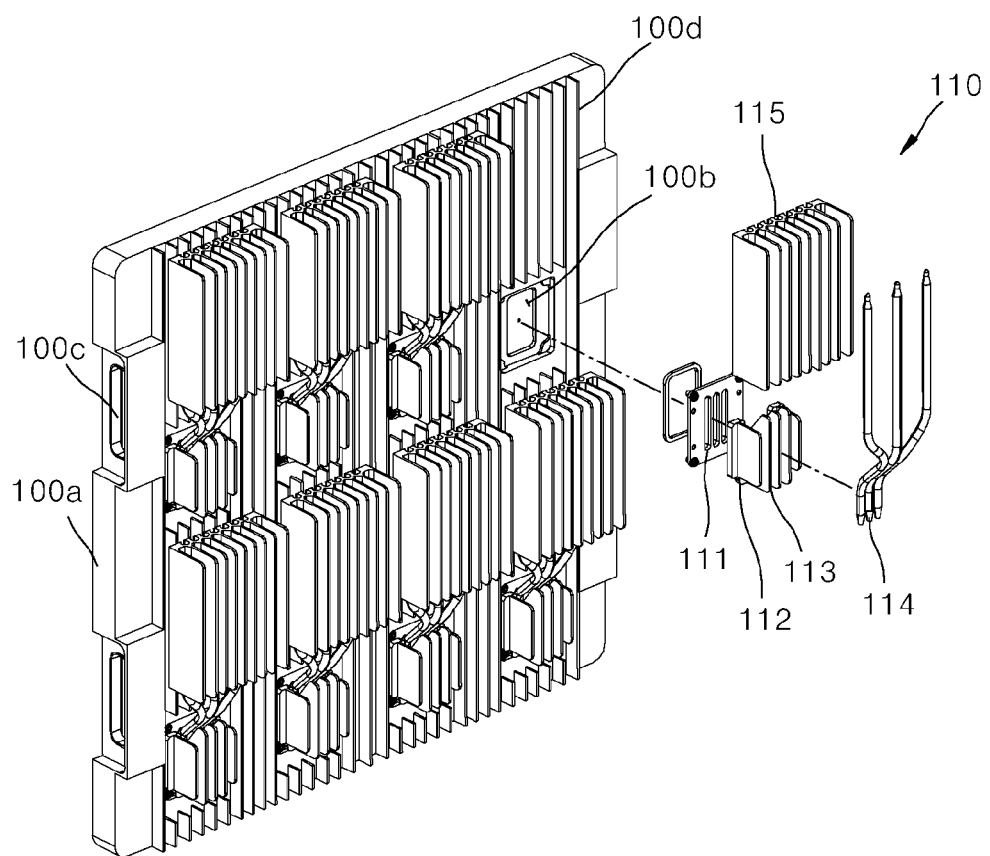
FIG. 6 is an exploded perspective view illustrating filter unit heat dissipation modules of the filter unit of FIGS. 3A and 3B.
Figure 7:
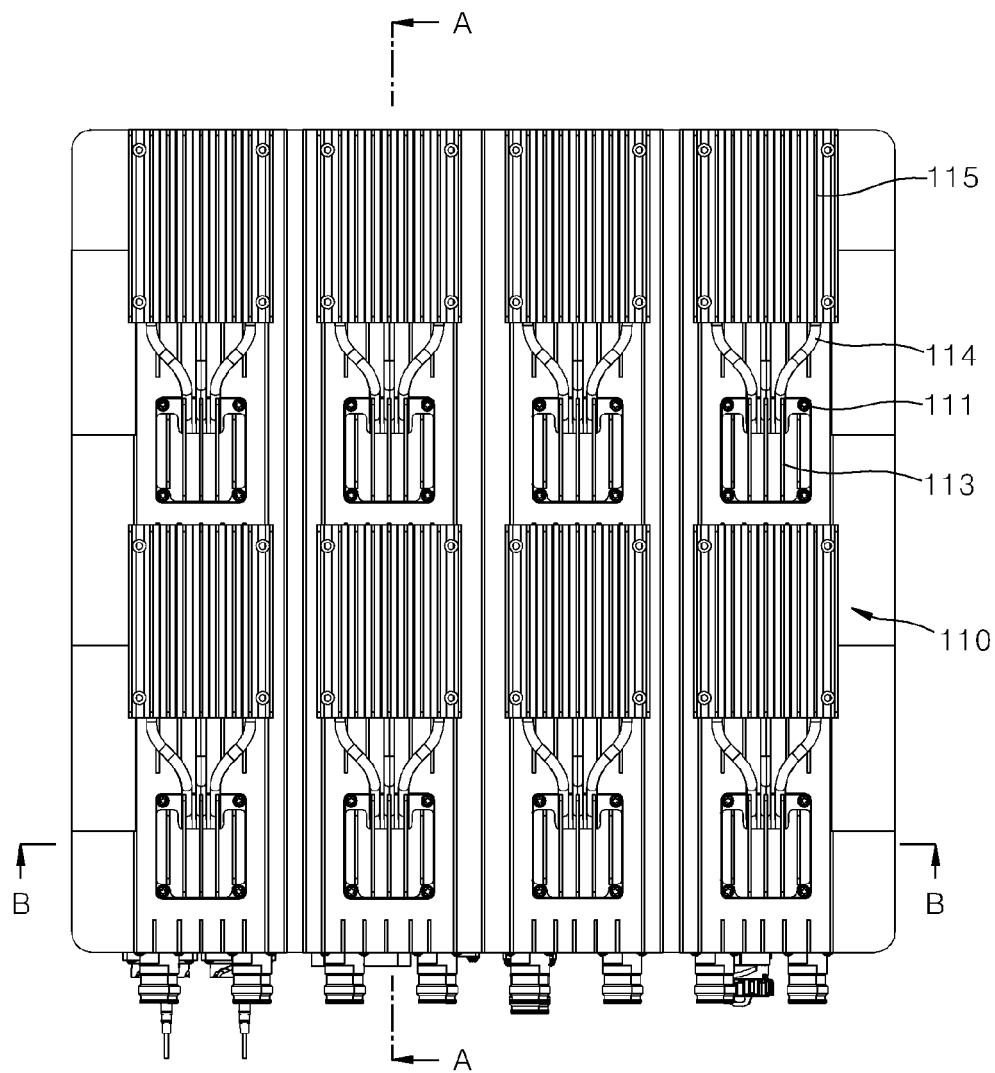
FIG. 7 is a rear view illustrating the filter unit of FIGS. 3A and 3B.
Figure 8:
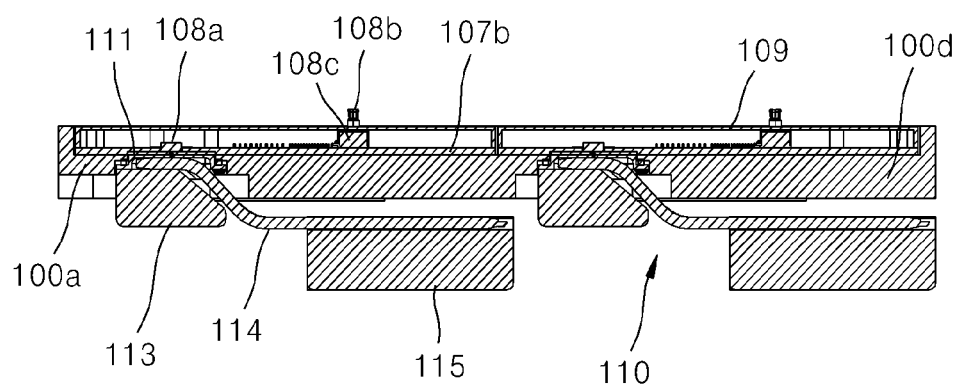
FIG. 8 is a cross-sectional view taken along line A-A of FIG. 7.
Figure 9:
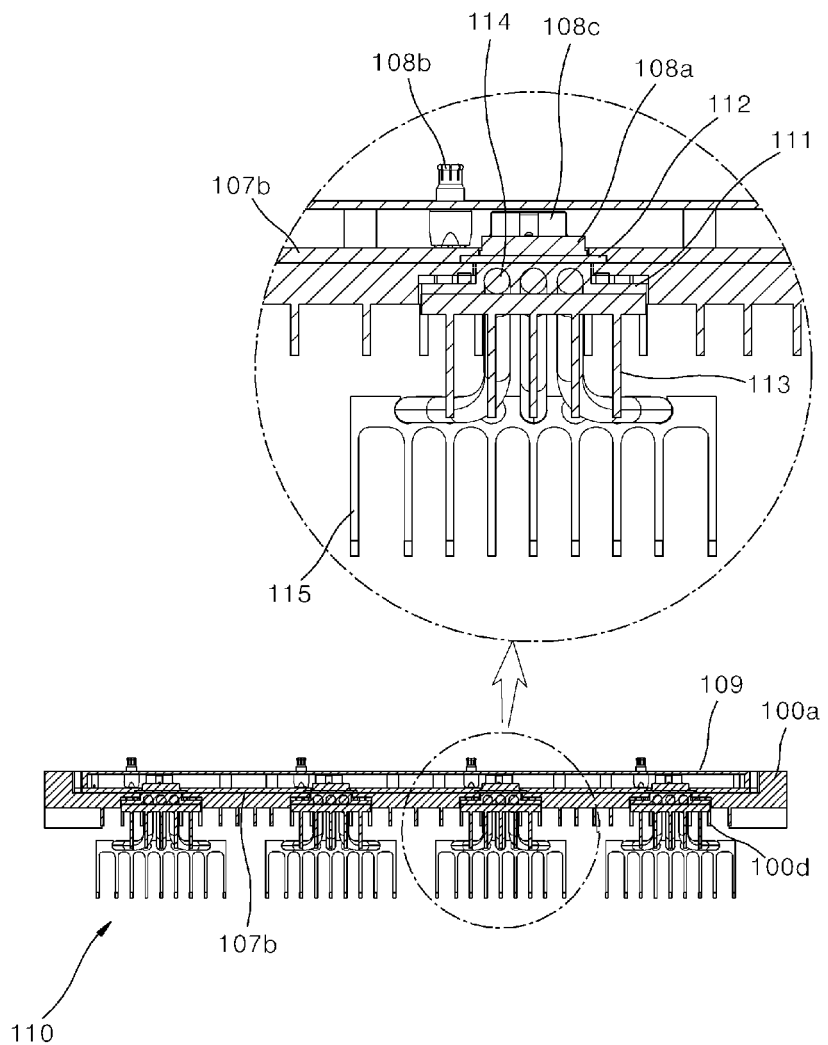
FIG. 9 is a cross-sectional view taken along line B-B of FIG. 7.

FIGS. 3A and 3B are exploded perspective views illustrating the filter unit 100 in the configuration of FIG. 1. FIG. 4 is an exploded perspective view illustrating the LPFs 105 installed on the filter PCB 107a of the filter unit 100 of FIGS. 3A and 3B. FIGS. 5A and 5B are exploded perspective views illustrating the PA PCB 107b of the filter unit 100 of FIGS. 3A and 3B. FIG. 6 is an exploded perspective view illustrating filter unit heat dissipation modules 110 of the filter unit 100 of FIGS. 3A and 3B. FIG. 7 is a rear view illustrating the filter unit 100 of FIGS. 3A and 3B. FIG. 8 is a cross-sectional view taken along line A-A of FIG. 7. FIG. 9 is a cross-sectional view taken along line B-B of FIG. 7.

As illustrated in FIGS. 3A and 3B, the filter PCB 107a and the PA PCB 107b may be stacked and disposed in a predetermined installation space defined in a filter unit body 100a forming the frame of the filter unit 100. The filter unit body 100a has the above installation space defined therein while being open toward the electronics unit 200, which will be described later, coupled thereto. The filter PCB 107a and the PA PCB 107b may be stacked and disposed in the installation space while forming a predetermined thickness.

In addition, the filter unit body 100a may have a plurality of heat dissipation installation holes 100b formed on the closed inner surface thereof while being open outward. The filter unit heat dissipation modules 110, which will be described later, may be coupled to either a plurality of main transistors (TRs) for power amplification 108a or the RF elements so as to be in direct thermal contact therewith by passing through the heat dissipation installation holes 100b.

The filter unit body 100a may have terminal insertion holes 100c provided at the left and right ends thereof for terminal connection of a first interface block connector 310 and a second interface block connector 320 to be described later.

In more detail, as illustrated in FIGS. 3A and 3B, the filter unit 100 may include the PA PCB 107b configured to form at least one layer, the PA PCB 107b being disposed in the installation space of the filter unit body 100a and having the main TRs for power Amplification 108a mounted on one surface thereof, and the filter PCB 107a spaced apart at a predetermined distance from the PA PCB 107b, the filter PCB 107a having a plurality of air strip lines 106 arranged on one surface thereof to constitute the LPFs 105. The filter unit 100 may form two layers through the PA PCB 107b and the filter PCB 107a.

That is, as illustrated in FIG. 3A, the main TRs for power amplification 108a of the power amplifier may be mounted on one surface of the PA PCB 107b. The main TRs for power amplification 108a are intensive heating elements whose heat may be radiated to the outside by the filter unit heat dissipation modules 110.

As illustrated in FIG. 4, the filter PCB 107a may include a plurality of enclosures 102 to accommodate the air strip lines 106 having eight transmit/receive (TRX) ports arranged thereon. The air strip lines 106 are configured in such a manner that four long connection ports 102a and four short connection ports 102a are arranged alternatively and repeatedly for both transmission to and reception from antennas.

The enclosures 102 may include enclosure covers 103 covering the air strip lines 106 accommodated therein, respectively. The enclosures 102 and the enclosure covers 103 are formed on a pocket surface, which is the same surface as that where the air strip lines 106 are provided and is opposite to that where the connection ports 102a is provided, with the consequence that they can be designed in a maximum size, resulting in a significant improvement in RF performance. In addition, by arranging the air strip lines 106 on a surface opposite to the pocket surface, it is possible to improve the degree of freedom of the LPFs 105 when designing the configuration thereof on the pocket surface.

As illustrated in FIG. 4, the filter PCB 107a may include a plurality of RET ports 104 arranged, at the end thereof, in a left and right direction in the drawing. The RET ports 104 are respectively connected to the LPFs 105 and are provided to enable electronic tilting remotely for control of antennas.

As illustrated in FIG. 5A, PA OUT ports 108b connected to filter input terminals of the LPFs 105 may be mounted and disposed on the PA PCB 107b, and a plurality of circulators 108c may be provided near the PA OUT ports 108b to protect circuits during signal receive (RX). The filter PCB 107a and the PA PCB 107b are spaced apart at a predetermined distance from each other in a thickness direction by at least the height of the circulators 108c. The PA OUT ports 108b and the circulators 108c are located in a space between the PCBs. The PA OUT ports 108b may have a height larger than the above separation distance so that the filter input terminals of the LPFs 105 are inserted and fixed into the PA OUT ports 108b.

As illustrated in FIGS. 5A and 5B, the filter unit body 100a may serve as a filter-side heat dissipation cover to cover the filter PCB 107a and the PA PCB 107b. The filter unit body 100a serving as the filter-side heat dissipation cover has a plurality of radiating fins 100d formed thereon, and a PA clamshell 109 is disposed between the filter PCB 107a and the PA PCB 107b in the installation space of the filter unit body 100a. Therefore, it is possible to shield electromagnetic waves for the PA or the PA PCB 107b.

As illustrated in FIG. 6, the filter unit heat dissipation modules 110 may be coupled to the outside of the filter unit body 100a. The filter unit heat dissipation modules 110 serve to collect heat generated by the main TRs for power amplification 108a, which are intensive heating elements, to radiate the heat to the outside.

That is, the filter unit heat dissipation modules 110 are coupled to the outside of the filter unit body 100a in order to radiate heat, generated by the main TRs for power amplification 108a, via heat transfer paths through the heat dissipation installation holes 100b penetrating the filter unit body 100a.

As illustrated in FIGS. 6 to 9, each of the filter unit heat dissipation modules 110 may include a heat collection plate 111 adhered to a heating surface of an associated one of the main TRs for power amplification 108a to collect heat, a first radiating fin part 113 disposed to be in contact with the outer surface of the heat collection plate 111 and having a plurality of radiating fins formed thereon, a second radiating fin part 115 spaced horizontally outward from the first radiating fin part 113 and having a plurality of radiating fins formed thereon to radiate heat, transferred from the first radiating fin part 113, at a long distance, a heat transfer medium block 112 configured to transfer heat from the heat collection plate 111 to the first radiating fin part 113, and a plurality of heat pipes 114, each having one end inserted between the first radiating fin part 113 and the heat transfer medium block 112 and the other end connected to the second radiating fin part 115 so as to transfer heat from the heat transfer medium block 112 to the second radiating fin part 115.

Here, the heat collection plate 111 and the heat transfer medium block 112 may be provided as a copper plate made of copper (Cu). However, the heat collection plate 111 is not necessarily made of pure copper, and may be made of an alloy material containing copper. This is to ensure that the heat generated by each of the main TRs for power amplification, which are intensive heating elements, is effectively radiated to the outside through the heat collection plate 111 and the heat transfer medium block 112, which are made of copper having higher thermal conductivity.

The heat collection plate 111 may be inserted into each of the heat dissipation installation holes 100b formed so as to correspond to respective positions of the filter unit body 100a where the main TRs for power amplification are mounted.

In the antenna apparatus 1 according to the embodiment of the present disclosure, as described above, the heat generated by the main TRs for power amplification, which are intensive heating elements, is effectively radiated to the outside through the filter unit heat dissipation modules 110 provided as separate modules. In addition, the heat generated within the filter unit body 100a although it is not generated by the intensive heating elements is radiated to the outside through the radiating fins 100d provided on the filter unit body 100a. Therefore, it is possible to facilitate active heat dissipation design for each heating element.

For example, when the intensive heating elements mounted on the PA PCB 107b are provided as heating elements with different specifications or dimensions other than the main TRs for power amplification, it is possible to design dedicated heat dissipation modules with optimal heat dissipation performance by pre-calculating the degree of heat generation of those heating elements.

The heat generated by each of the main TRs for power amplification is collected in the heat collection plate 111. Then, some of the collected heat is directly transferred to the first radiating fin part 113 through the heat transfer medium block 112, and the remainder is transferred to the heat pipes 114. Accordingly, heat dissipation is performed at a close distance through the first radiating fin part 113, and it is performed at a long distance through the second radiating fin part 115. Since the outer end of each of the first and second radiating fin parts 113 and 115 is at least located further outward than the radiating fins 100d directly provided on the outer surface of the filter unit body 100a, it is possible to separately radiate the heat generated in the installation space of the filter unit body 100a and the heat generated by the main TR for power amplification.

Figure 10A:
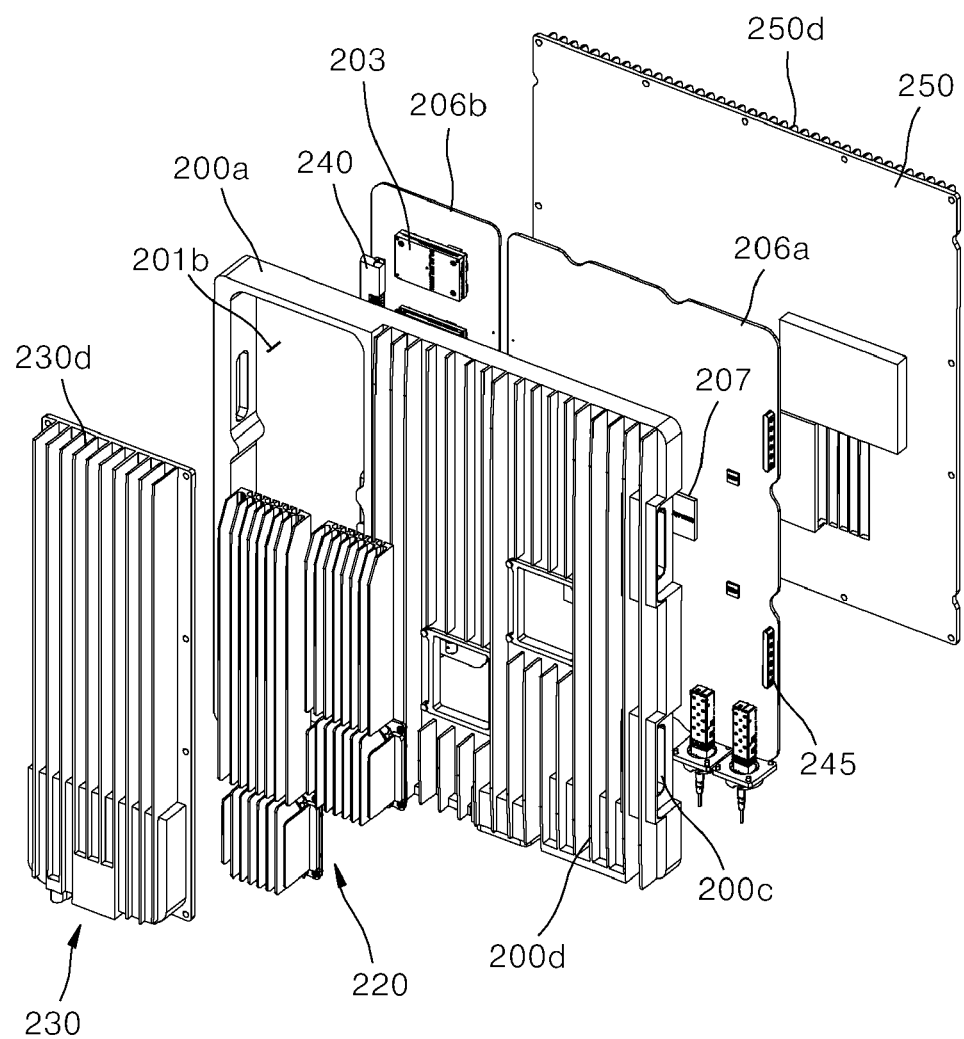
FIGS. 10A and 10B are exploded perspective views illustrating an electronics unit in the configuration of FIG. 1.
Figure 10B:
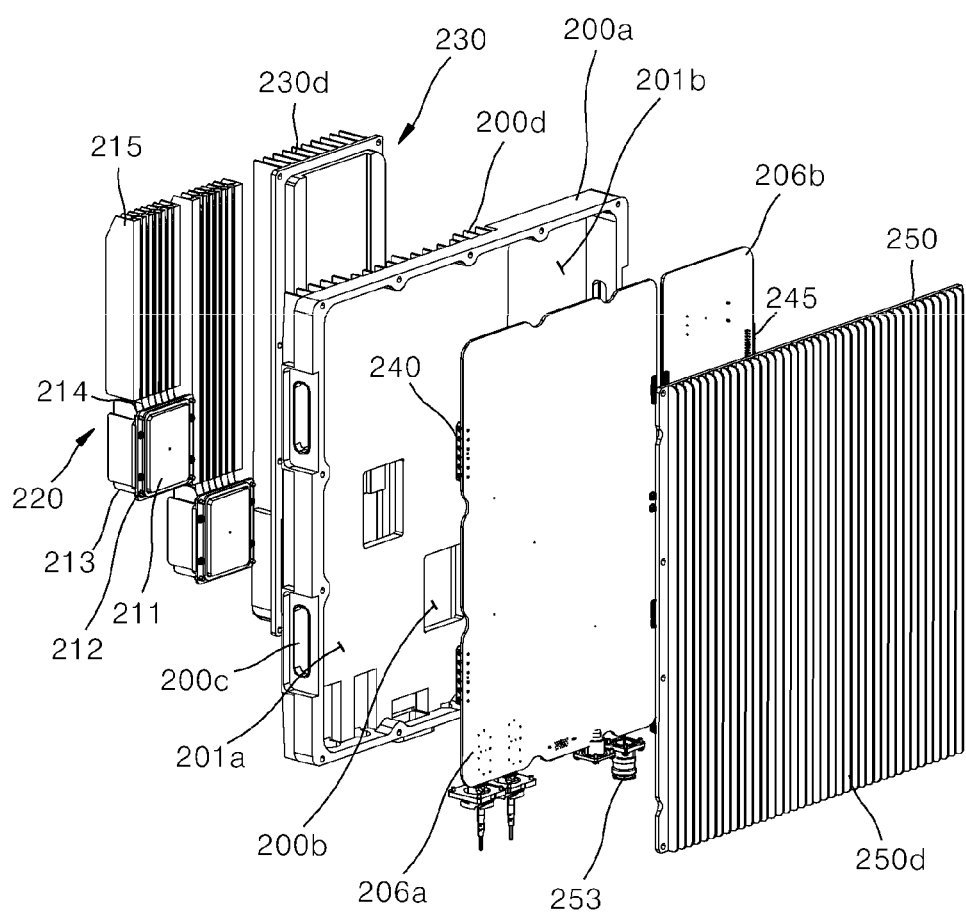
Figure 11:
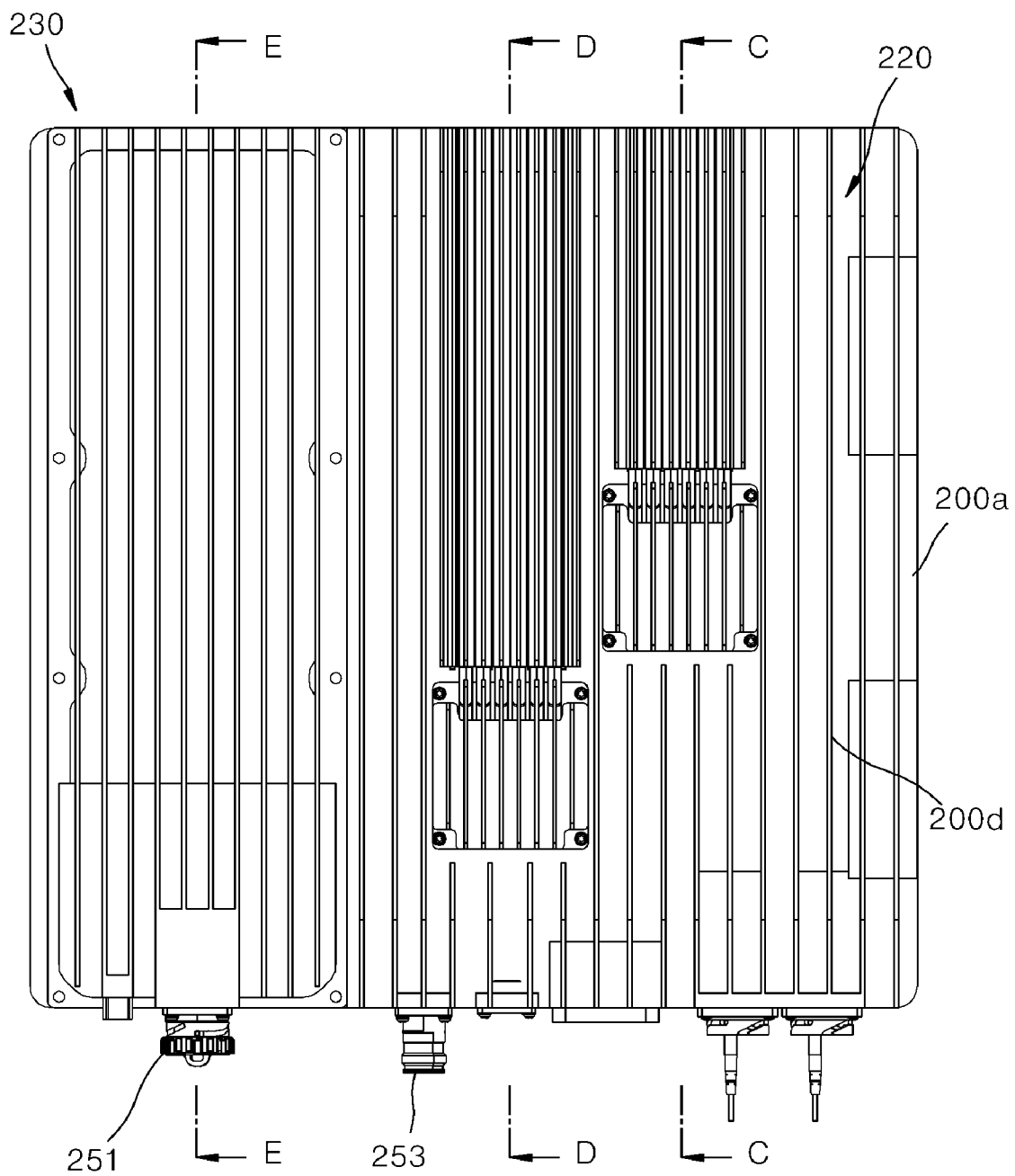
FIG. 11 is a front view illustrating the electronics unit of FIGS. 10A and 10B.
Figure 12:
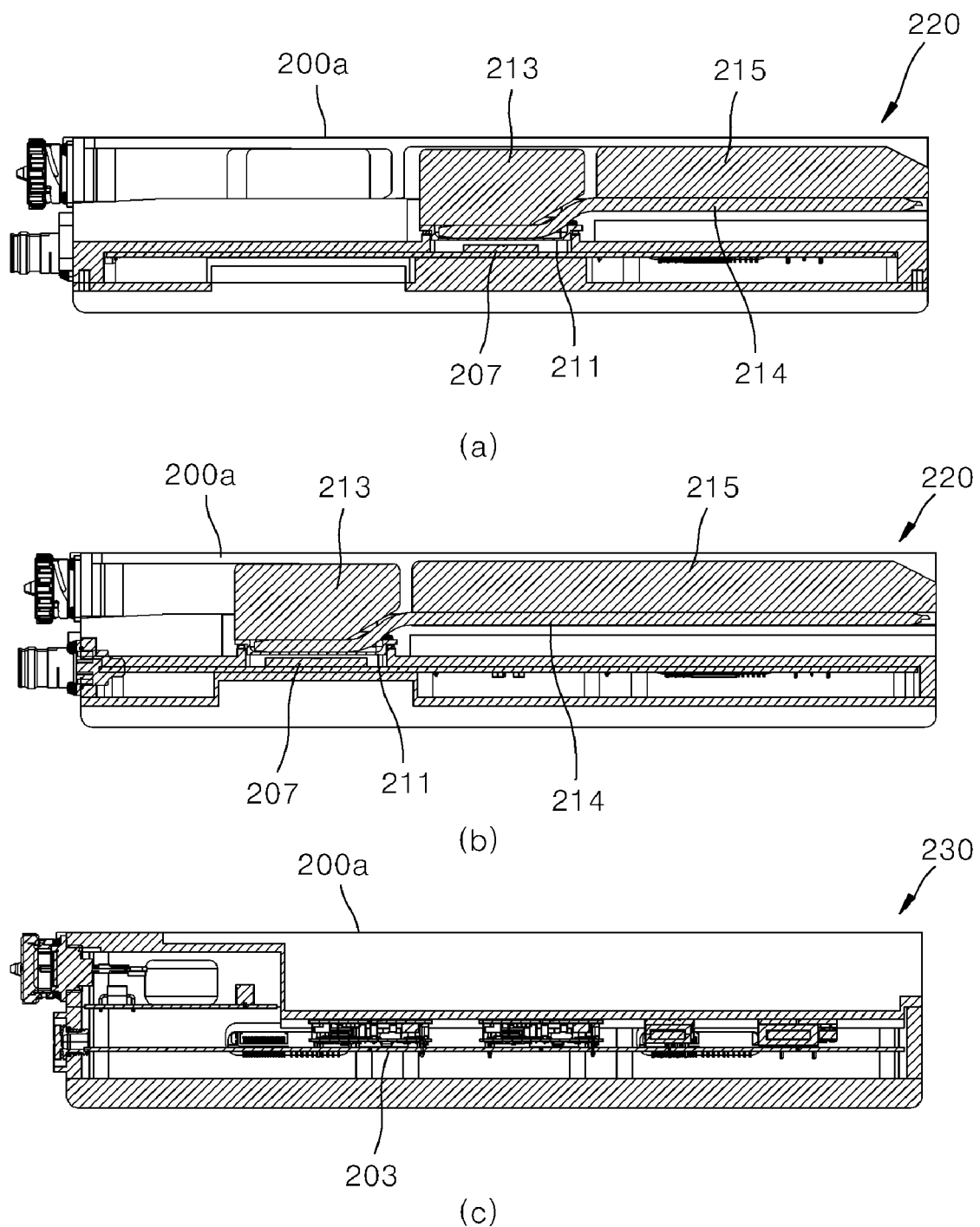
FIG. 12 illustrates cross sections taken along lines C-C, D-D, and E-E of FIG. 11.

FIGS. 10A and 10B are exploded perspective views illustrating the electronics unit 200 in the configuration of FIG. 1. FIG. 11 is a front view illustrating the electronics unit 200 of FIGS. 10A and 10B. FIG. 12 illustrates cross sections taken along lines C-C, D-D, and E-E of FIG. 11.

As illustrated in FIGS. 10A and 10B, the electronics unit 200 includes an electronics unit body 200a having at least two partitioned installation spaces 201a and 201b while being open toward the filter unit 100, the electronics unit body 200a having a plurality of radiating fins 200d integrally formed on a surface (hereinafter, referred to as a "front surface") opposite to the surface thereof to which the filter unit 100 is adjacent, which is a portion corresponding to one of the at least two partitioned installation spaces 201a and 201b (hereinafter, one space is referred to as a "first installation space 201a", and the other is referred to as a "second installation space 201b"), a first electronics PCB 206a installed in the first installation space 201a of the electronics unit body 200a, a plurality of field programmable gate arrays (FPGAs) 207 being mounted on one surface of the first electronics PCB 206a facing the front surface, and a second electronics PCB 206b installed in the second installation space 201b of the electronics unit body 200a, a plurality of power supply unit (PSU) DC power modules 203 being mounted on one surface of the second electronics PCB 206b facing the front surface.

The first and second electronics PCBs 206a and 206b may be partitioned by the first and second installation spaces 201a and 201b at the same height to form one layer.

In more detail, as illustrated in FIGS. 10A and 10B, the electronics unit body 200a may be open toward the filter unit 100, may be in the form of a rectangular parallelepiped having a predetermined thickness, and may have two partitioned spaces, which are the first installation space 201a defined at one side thereof and the second installation space 201b defined at the other side thereof. In particular, the second installation space 201b equipped with the PSU DC power modules 203 may be in an open shape at both sides in a thickness direction thereof.

The radiating fins 200d may be integrally formed on the front surface corresponding to the first installation space 201a of the electronics unit body 200a to immediately radiate heat in the first installation space 201a to the outside.

In addition, a plurality of heat dissipation holes 200b may be formed to penetrate the electronics unit body 200a between the radiating fins 200d so as to expose the heating surfaces of the FPGAs 207 to the outside. Here, the number of heat dissipation holes 200b may correspond to the number of FPGAs 207.

The FPGAs 207 may be mounted on the first electronics PCB 206a provided in the first installation space 201a of the electronics unit body 200a. The FPGAs 207 are a type of FPGA semiconductor, and are a type of intensive heating element, like the main TRs for power amplification 108a described above.

Meanwhile, as illustrated in FIGS. 10A and 11, the electronics unit includes an electronics unit heat dissipation module 210. The electronics unit heat dissipation module 210 may include a first electronics-side heat dissipation section 220 disposed to be in thermal contact with the FPGAs 207 through the heat dissipation holes 200b formed in the electronics unit body 200a and located further forward than the radiating fins 200d formed on the electronics unit body 200a, and a second electronics-side heat dissipation section 230 coupled to the outer surface of the electronics unit body 200a to close an opening 201a formed in the electronics unit body 200a and provided to be in contact with the PSU DC power modules 203 on the first electronics PCB 206a.

Hereinafter, for convenience of explanation, the FPGAs 207 intensively arranged on one side of the electronics unit body 200a will be defined as "first heating elements", and the PSU DC power modules 203 intensively arranged on the other side of the electronics unit body 200a will be defined as "second heating elements".

The first electronics-side heat dissipation section 220 of the electronics unit heat dissipation module 210 has the same configuration and dimension as each of the filter unit heat dissipation modules 110 of the filter unit 100.

In more detail, as illustrated in FIGS. 12(a) and 12(b), the first electronics-side heat dissipation section 220 may include a heat collection plate 211 adhered to a heating surface of each of the FPGAs 207 to collect heat, a first radiating fin part 213 disposed to be in contact with the outer surface of the heat collection plate 211 and having a plurality of radiating fins formed thereon, a second radiating fin part 215 spaced horizontally outward from the first radiating fin part 213 and having a plurality of radiating fins formed thereon to radiate heat, transferred from the first radiating fin part 213, at a long distance, a heat transfer medium block 212 configured to transfer heat from the heat collection plate 211 to the first radiating fin part 213, and a plurality of heat pipes 214, each having one end inserted between the first radiating fin part 213 and the heat transfer medium block 212 and the other end connected to the second radiating fin part 215 so as to transfer heat from the heat transfer medium block 212 to the second radiating fin part 215. In the antenna apparatus according to the embodiment of the present disclosure, two FPGAs 207 are mounted on the front surface of the first electronics PCB 206a, wherein one of the two FPGAs 207 may be relatively located at the top of the drawing and the other may be relatively located at the bottom of the drawing in order to prevent heat concentration in the first installation space 201a.

Accordingly, in the configuration of the first electronics-side heat dissipation section 220, the second radiating fin part 215 and the heat pipes 214 involved in each FPGA 207 may be designed to have different lengths.

As illustrated in FIGS. 10A and 10B, the second electronics-side heat dissipation section 230 may have a plurality of radiating fins 230d integrally formed thereon. The radiating fins 230d have the same height as the radiating fins 200d formed on the outer surface of the electronics unit body 200a. The second electronics-side heat dissipation section 230 may be coupled to one side of the second installation space 201b of the electronics unit body 200a which is open at both sides thereof, in order to close one side of the second installation space 201b and form an integral appearance together with the radiating fins 200d formed on the outer surface of the electronics unit body 200a.

As illustrated in FIG. 12(c), a portion of the inner surface of the second electronics-side heat dissipation section 230 may be in direct contact with the heating surfaces of the PSU DC power modules 203 to immediately radiate heat generated by the PSU DC power modules 203 to the outside. Furthermore, the second electronics-side heat dissipation section 230 may also radiate the heat in the second installation space 201b to the outside through the radiating fins 200d.

The PSU DC power modules 203 mounted in the second installation space 201b may be used for 5V, 12V, and 30V depending on the size of the rectified voltage thereof. However, it will be natural that various voltage DC power modules 203 may be used in some cases.

As described above, in the antenna apparatus according to the embodiment of the present disclosure, various voltage DC power modules 203 may be used in some cases. Accordingly, in order to facilitate the replacement and assembly of the DC power modules, the antenna apparatus is configured such that the second installation space 201b is open in a direction opposite to the side where the filter unit 100 is provided, the second electronics PCB 206b is also separable from the first electronics PCB 206a, and the individual first and second electronics-side heat dissipation sections 220 and 230 allow for independent heat dissipation.

As illustrated in FIG. 12(c), each of the PSU DC power modules 203 on the second electronics PCB 206b may be provided at one side thereof with a surge protector line filter 208. The second electronics PCB 206b may be provided at the front end thereof with a power input connector 253 for supply of external power. In addition, the second electronics PCB 206b may be provided at the front end thereof with a Gore-Tex member 251 that performs a pressure control function to prevent an increase in pressure in the first or second installation space 201a or 201b due to heat generated by the operation of electrical/electronic components.

Meanwhile, an electronics unit heat dissipation cover 250 may be coupled to an outer surface of the electronics unit body 200a on which the radiating fins 200d are not formed, as illustrated in FIGS. 10A and 10B. The electronics unit heat dissipation cover 250 may also have a plurality of radiating fins 250d formed on the outer surface thereof to radiate heat in the first and second installation spaces 201a and 201b of the electronics unit body 200a to the outside.

Figure 13:
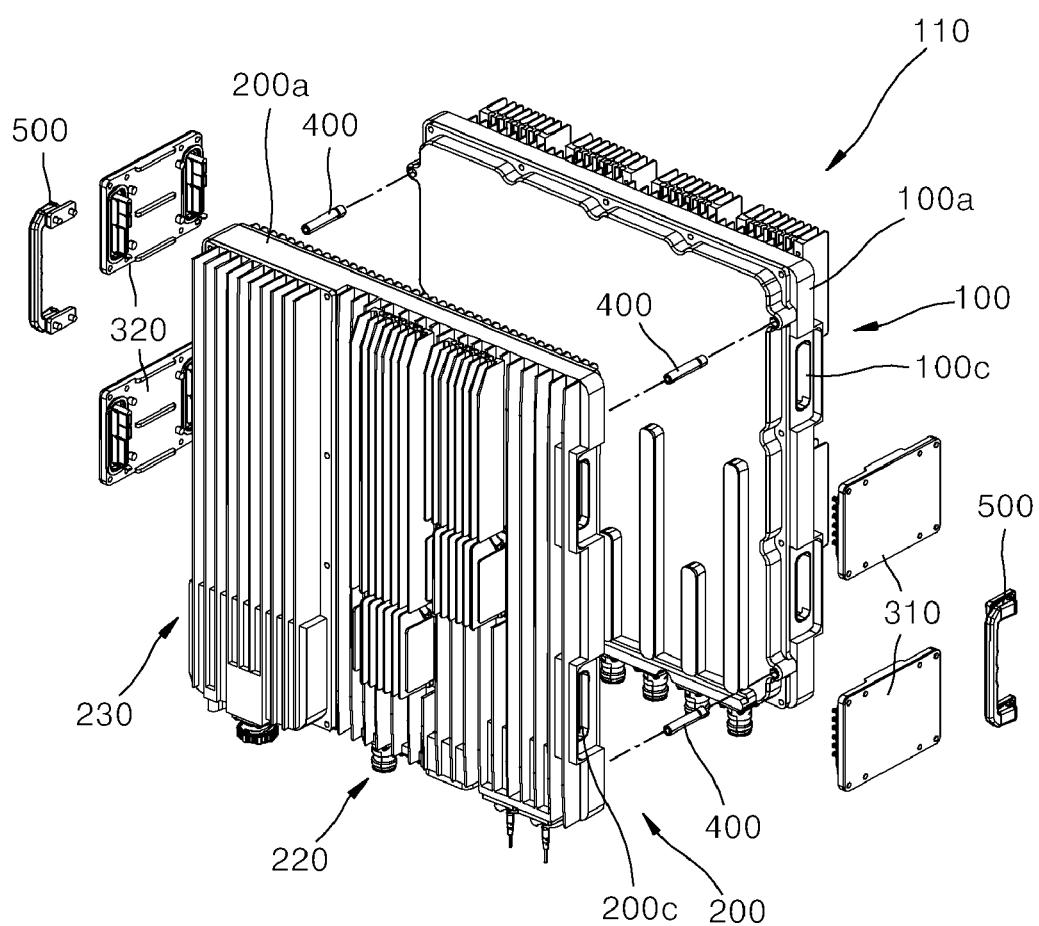
FIG. 13 is an exploded perspective view illustrating a coupling relationship of air supporters that allow the filter unit and the electronics unit to be spaced apart from each other in the configuration of FIG. 1.

FIG. 13 is an exploded perspective view illustrating a coupling relationship of air supporters 400 that allow the filter unit 100 and the electronics unit 200 to be spaced apart from each other in the configuration of FIG. 1.

As illustrated in FIG. 13, the filter unit 100 and the electronics unit 200 may have facing surfaces, respectively, which are spaced apart from each other by a plurality of air supporters 400. The air supporters 400 allow the filter unit 100 and the electronics unit 200 to be spaced apart from each other by a predetermined distance in order to define a space for heat dissipation through a plurality of radiating fins 250d formed on the facing surfaces thereof, as well as serving to mutually couple the filter unit 100 and the electronics unit 200. Thus, it is possible to significantly improve heat dissipation performance.

Meanwhile, as illustrated in FIGS. 5A, 5B, 10A, 10B, and 13, the PA PCB 107b of the filter unit 100 may have at least one filter-side power connection terminal 140 and at least one filter-side signal connection terminal 145 provided at one side thereof. The first electronics PCB 206a of the electronics unit 200 may be provided with at least one electronics-side power connection terminal 240, and the second electronics PCB 206b of the electronics unit 200 may be provided with at least one electronics-side signal connection terminal 245.

As illustrated in FIG. 13, the antenna apparatus 1 according to the embodiment of the present disclosure may further include the first interface block connector 310 coupled to, and configured to form a thick portion at, one side thereof to interconnect the at least one filter-side power connection terminal 140 and the at least one electronics-side power connection terminal 240, and the second interface block connector 320 coupled to, and configured to form a thick portion at, the other side thereof to interconnect the at least one filter-side signal connection terminal 145 and the at least one electronics-side signal connection terminal 245.

The first and second interface block connectors 310 and 320 are interface entities for transmitting and receiving power or data signals. The first and second interface block connectors 310 and 320 serve to reduce self-heating by disposing conventional power connection lines, etc., which were internally wired together with electrical/electronic components or heating elements, to the outside of the filter unit body 100a and electronics unit body 200a. In addition, it is possible to maximize the space utilization of each unit (the filter unit 100 or the electronics unit 200) by disposing conventional power connection lines, etc., to the outside, and to create additional benefits of facilitating the assembly process of the antenna apparatus by combining them in a socket connection manner.

The first interface block connector 310 may serve as a connection port for supplying power and signaling data to electrical driving components such as power supply units (PSUs) and power amplifiers (PAs). In addition, the second interface block connector 320 may serve as a port for transmitting and receiving RF signals through various electrical/electronic components provided on the first and second electronics PCBs 206a and 206b.

Here, the arrangement of signal lines for supplying power and transmitting data signals through the first and second interface block connectors 310 and 320 is preferably standardized to easily respond to A/S such as replacement of components or failure/repair according to the change in design in the future, which will be described later.

As illustrated in FIG. 2, the antenna apparatus according to the embodiment of the present disclosure configured as described above can create benefits of providing a platform structure that easily responds to A/S such as replacement of components or failure/repair according to the change in design in the future, by forming a sub-assembly of the heating elements with the same dimension and specification (that is, the main TRs for power amplification of the filter unit 100, the FPGAs 207 provided in the first installation space 201a of the electronics unit 200, and the PSU DC power modules 203 provided in the second installation space 201b) together with the filter unit heat dissipation modules and the electronics unit heat dissipation module. Forming the sub-assembly of the components as described above can maximize the space utilization among the filter unit 100, the electronics unit 200, and other units added through the change in design, as well as gaining design advantages by universalizing existing connections in the assembly process.

This is possible through the design application of common lines by the first and second interface block connectors 310 and 320 serving as connection ports for supplying power and signaling data between the filter unit 100 and the electronics unit 200 which are spaced apart from each other by the air supporters 400.

Meanwhile, as illustrate in FIG. 13, a pair of handles 500 may be connected to one of the filter unit 100 and the electronics unit 200 to easily transport the antenna apparatus according to the embodiment of the present disclosure manually by the operator.

The antenna apparatus according to the exemplary embodiments of the present disclosure has been described in detail with reference to the accompanying drawings in the above. However, the exemplary embodiments of the present disclosure should not be construed as limiting the technical idea of the disclosure. It will be apparent to those skilled in the art that the scope of the present disclosure is limited only by the appended claims and various variations and modifications may be made without departing from the spirit and scope of the disclosure. Therefore, these variations and modifications will fall within the scope of the present disclosure as long as they are apparent to those skilled in the art.

INDUSTRIAL APPLICABILITY

The present disclosure provides an antenna apparatus having a simpler arrangement structure while matching and arranging independent heat dissipation parts corresponding to a group of heating elements with the same specification and dimension.

The invention claimed is:
1. An antenna apparatus comprising:
a filter unit disposed to form at least one layer;
an electronics unit spaced apart from the filter unit to form a layer different from that of the filter unit, and equipped therein with various electrical/electronic devices;
a filter unit heat dissipation module coupled to a surface opposite to the surface of the filter unit to which the electronics unit is coupled, to radiate heat generated by the filter unit to the outside; and
an electronics unit heat dissipation module comprising a first electric unit heat dissipation module coupled to a surface opposite to the surface of the electronics unit to which the filter unit is coupled, to radiate heat, generated by first heating elements intensively arranged on one side of the filter unit, to the outside, and a second electronics unit heat dissipation module provided in parallel with the first electronics unit heat dissipation module to radiate heat, generated by second heating elements intensively arranged on the other side of the filter unit, to the outside.

2. The antenna apparatus according to claim 1, wherein the filter unit and the electronics unit are spaced apart at a predetermined distance from each other by a plurality of air supporters each having one end coupled to the filter unit and the other end coupled to the electronics unit.

3. The antenna apparatus according to claim 1, wherein the filter unit comprises:
a filter unit body having a predetermined installation space defined on one side thereof;

a power amplifier (PA) printed circuit board (PCB) disposed in the installation space of the filter unit body, and having a plurality of main transistors (TRs) for power amplification mounted on one surface thereof; and a filter PCB spaced apart at a predetermined distance from the PA PCB, and having a plurality of low pass filters (LPFs) arranged on one surface thereof, and wherein the filter unit forms two layers through the PA PCB and the filter PCB.

4. The antenna apparatus according to claim 3, wherein the filter unit heat dissipation module is coupled to the outside of the filter unit body in order to radiate heat, generated by the main TRs for power amplification, via heat transfer paths through the filter unit body.

5. The antenna apparatus according to claim 4, wherein the filter unit heat dissipation module comprises:

a heat collection plate adhered to a heating surface of each of the main TRs for power amplification to collect heat;

a first radiating fin part disposed to be in contact with an outer surface of the heat collection plate and having a plurality of radiating fins formed thereon;

a second radiating fin part spaced horizontally outward from the first radiating fin part and having a plurality of radiating fins formed thereon to radiate heat, transferred from the first radiating fin part, at a long distance;

a heat transfer medium block configured to transfer heat from the heat collection plate to the first radiating fin part; and a plurality of heat pipes, each having one end inserted between the first radiating fin part and the heat transfer medium block and the other end connected to the second radiating fin part, so as to transfer heat from the heat transfer medium block to the second radiating fin part.

6. The antenna apparatus according to claim 5, wherein the heat collection plate and the heat transfer medium block are made of copper.

7. The antenna apparatus according to claim 1, wherein the electronics unit comprises:

an electronics unit body having at least two partitioned installation spaces while being open toward the filter unit, the electronics unit body having a plurality of radiating fins integrally formed on a surface (hereinafter, referred to as an "outer surface") opposite to its surface to which the filter unit is adjacent, which is a portion corresponding to one of the at least two partitioned installation spaces (hereinafter, one space is referred to as a "first installation space", and the other is referred to as a "second installation space");

a first electronics PCB installed in the first installation space of the electronics unit body, a plurality of field programmable gate arrays (FPGAs) being mounted on one surface of the first electronics PCB facing the outer surface; and a second electronics PCB installed in the second installation space of the electronics unit body, a plurality of power supply unit (PSU) DC power modules being mounted on one surface of the second electronics PCB facing the outer surface, and wherein the first and second electronics PCBs are partitioned by the first and second installation spaces at the same height to form one layer.

8. The antenna apparatus according to claim 7, wherein the electronics unit heat dissipation module comprises:

a first electronics-side heat dissipation section disposed to be in thermal contact with the FPGAs through a plurality of heat transfer holes formed in the electronics unit body, and located further outward than the radiating fins formed on the electronics unit body; and a second electronics-side heat dissipation section coupled to the outer surface of the electronics unit body to close an opening formed in the electronics unit body, and provided to be in contact with the PSU DC power modules on the first electronics PCB.

9. The antenna apparatus according to claim 8, wherein the first electronics-side heat dissipation section comprises:

a heat collection plate adhered to a heating surface of each of the FPGAs to collect heat;

a first radiating fin part disposed to be in contact with an outer surface of the heat collection plate and having a plurality of radiating fins formed thereon;

a second radiating fin part spaced horizontally outward from the first radiating fin part and having a plurality of radiating fins formed thereon to radiate heat, transferred from the first radiating fin part, at a long distance;

a heat transfer medium block configured to transfer heat from the heat collection plate to the first radiating fin part; and a plurality of heat pipes, each having one end inserted between the first radiating fin part and the heat transfer medium block and the other end connected to the second radiating fin part, so as to transfer heat from the heat transfer medium block to the second radiating fin part.

10. The antenna apparatus according to claim 9, wherein the heat collection plate and the heat transfer medium block are made of copper.

11. The antenna apparatus according to claim 8, wherein the second electronics-side heat dissipation section has a plurality of radiating fins, which are integrally formed thereon and have the same height as the radiating fins formed on the outer surface of the electronics unit body.

12. The antenna apparatus according to claim 1, wherein the filter unit has at least one filter-side power connection terminal and at least one filter-side signal connection terminal, the electronics unit has at least one electronics-side power connection terminal and at least one electronics-side signal connection terminal, and the antenna apparatus further comprises:

a first interface block connector coupled to, and configured to form a thick portion at, one side thereof to interconnect the at least one filter-side power connection terminal and the at least one electronics-side power connection terminal; and a second interface block connector coupled to, and configured to form a thick portion at, the other side thereof to interconnect the at least one filter-side signal connection terminal and the at least one electronics-side signal connection terminal.

* * * * *